United States Patent

[11] 3,522,759

| [72] | Inventor: | Robert J. Martin |
| | | Hutchinson, Kansas |
| [21] | Application No.: | 747,877 |
| [22] | Filed: | July 26, 1968 |
| [45] | Patented: | Aug. 4, 1970 |
| [73] | Assignee: | The Cessna Aircraft Company |
| | | Wichita, Kansas |
| | | a Corp. of Kansas |

[54] PUMP OR MOTOR DEVICE
10 Claims, 5 Drawing Figs.
[52] U.S. Cl. .................................................. 91/507
[51] Int. Cl. .................................................. F04b 1/02,
F04b 9/00, F04b 9/06
[50] Field of Search ...................................... 103/162
complete; 91/198; 230/177

[56] References Cited
UNITED STATES PATENTS

| 2,776,628 | 1/1957 | Keel ....................... | 103/162 |
| 2,953,099 | 9/1960 | Budzich ................. | 103/162 |
| 3,191,543 | 6/1965 | Hann et al .............. | 103/162 |
| 3,292,553 | 12/1966 | Hann ..................... | 103/162 |
| 3,364,680 | 1/1968 | Osojnar .................. | 103/162 |
| 3,399,628 | 9/1968 | Rubinski ................ | 103/162 |
| 3,416,312 | 12/1968 | Margolin ................ | 103/162 |

*Primary Examiner*— William L. Freeh
*Attorney*— Gregory J. Nelson and Hubert E. Miller

ABSTRACT: An axial piston pump or motor using single spring means acting in opposite directions to bias the piston shoes onto the swash plate and the cylinder block onto the fluid valving surface, in which a grounded resilient member opposes the force of the spring means in one direction so that the forces acting on the piston shoes and cylinder block are of different magnitude.

INVENTOR.
ROBERT J. MARTIN

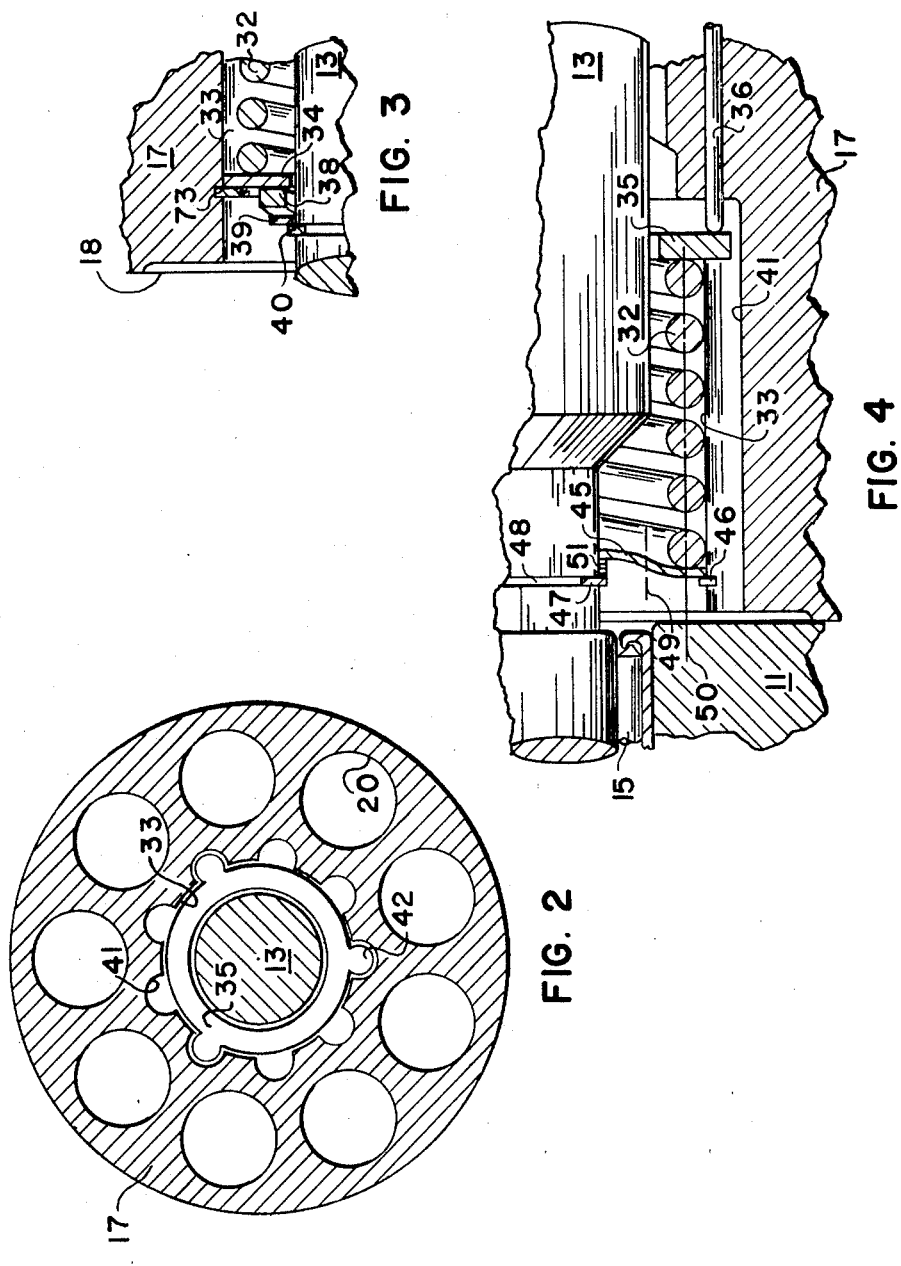

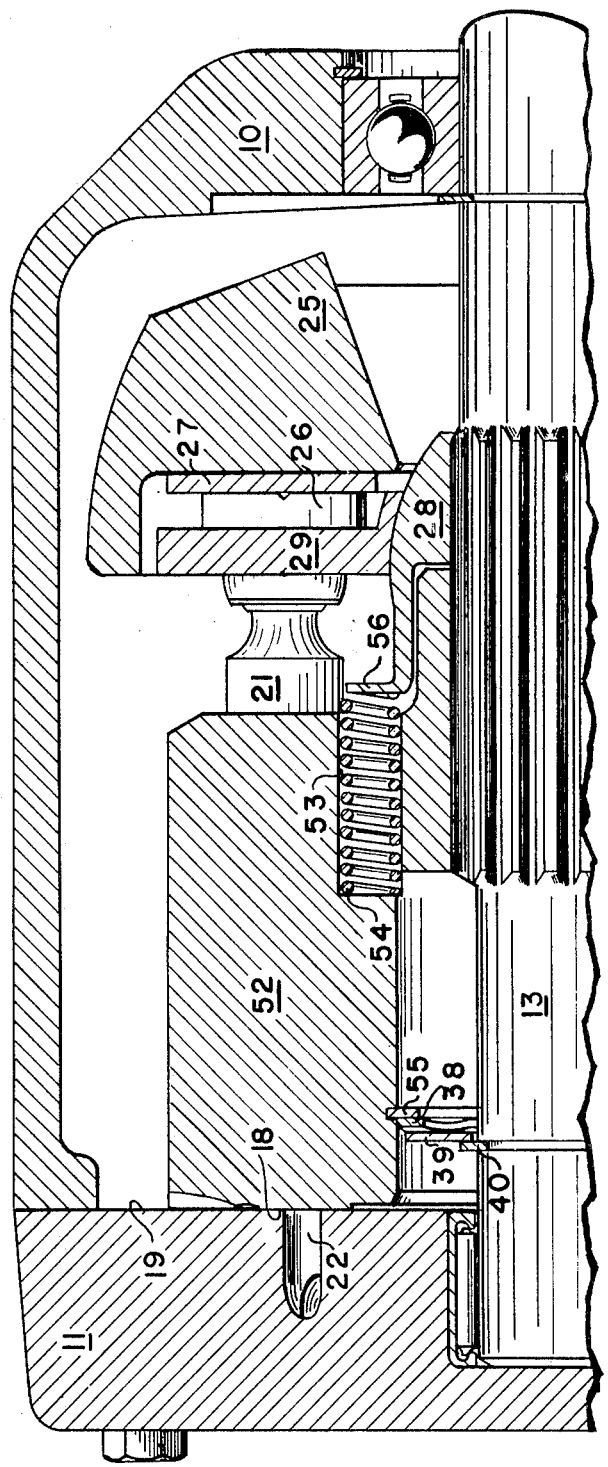

U.S. PATENT 3,522,759
PUMP OR MOTOR DEVICE

This invention relates to fluid energy translating devices and particularly to axial piston type hydraulic pumps and motors. More particularly, this invention relates to improvements in biasing the cylinder block toward the valving surface and the piston toward the cam plate.

Fluid energy devices of this class, operable either as a pump or motor, include a cylinder block with a plurality of concentric and axially disposed cylinder bores having pistons reciprocable therein. Piston shoes universally mounted to the outer ends of the pistons contact an inclined or tiltable cam plate to transmit and receive force to impart reciprocatory piston motion or transmit driving torque upon relative rotation between the cylinder block and cam plate. The cylinder block also rotates relative to the valving surface of a backplate which contains inlet and outlet passages that alternately communicate with the cylinder bores through ducts or passages in the cylinder block. Between the relatively rotating components (i.e., the stationary valving surface, rotating cylinder block and piston shoes, and stationary cam plate) hydrostatic fluid bearings provide proper lubrication and control the axial thrust of one component against the other. The fluid bearing is maintained by a controlled leakage of pressure fluid between the components, the pressure selectively balancing the axial thrusts of the components on each other.

It is highly advantageous to maintain the relatively rotating components in close engagement for correct unit operation. For example, efficient operation of the hydrostatic bearings requires such close contact. Under pressure operating conditions the cylinder block is hydraulically biased onto the backplate valving member; yet, during low pressure operation and start-up conditions, a supplemental bias is required to hold the cylinder block on the valving member. Similarly, a mechanical bias also is required to assist in maintaining the piston shoes in contact with the cam plate.

A previous solution for providing mechanical biases of the type described has been to utilize a single spring acting between the cylinder block and piston shoes, thus providing equal forces to bias the cylinder block toward the valving member and the piston shoes toward the cam plate. Because the forces necessary to maintain these elements (the cylinder block and the piston shoes) against their respective coacting surfaces are different in magnitude, the single spring arrangement exerts an unduly large bias on one of the elements in order to provide sufficient bias for the other element. Excessive force on the one element, of course, creates excessive friction and wear and is generally detrimental to operation of the unit.

Another method proposed in the prior art has been to incorporate separate spring means, each grounded to the drive shaft, acting independently to create the mechanical biasing forces. Utilizing two independent spring means acting in opposite directions affords unequal mechanical biasing forces on the cylinder block and the pistons so that neither is subject to an unnecessarily excessive force. However, in many cases, due to the relatively large biasing forces necessitated by both the shoes and cylinder block, a pair of large, bulky spring means are required. Along with taking considerable space, these separate spring means increase the overall size of the unit to impair its usefulness where there exists limited installation space. Additionally, this construction complicates assembly and disassembly as well as introducing relatively exacting tolerances on certain parts in order to maintain independent biasing forces and to prevent compounding of the actions of the two spring means.

It would be highly advantageous, therefore, to provide a device having single spring means for biasing the cylinder block against the valve plate and the pistons outwardly against the cam plate, but acting with different effective forces.

Accordingly, it is a general object of this invention to provide improved mechanical biasing means for urging the cylinder block and piston shoes of an axial piston unit against the valving surface and cam plate, respectively.

It is an additional object of this invention to provide improved biasing means capable of exerting unequal forces on the piston shoes and cylinder block.

Another object is to provide a single spring means for biasing both the cylinder block and the pistons against their respective coacting surfaces, and force limiting means for providing non-excessive and unequal biasing forces on the cylinder block and pistons.

A particular object of this invention is to provide spring means for biasing the cylinder block onto a valving surface and for biasing the pistons toward the cam plate, the spring means being partially grounded to the drive shaft to limit the biasing force acting in one direction.

Another object is to provide a piston pump of compact, economical design characterized by the preceding objects.

Other objects and advantages will become apparent from the following description and accompanying drawings, in which:

FIG. 2 is a partial section taken along line 2-2 of FIG. 1;

FIG. 3 is a fragmentary section to an enlarged scale better illustrating the central bore area of FIG. 1;

FIG. 4 is a fragmentary longitudinal section of a fluid energy translating device employing another embodiment of the invention;

FIG. 5 is a partial longitudinal section of a fluid energy translating device incorporating yet another embodiment of the invention.

Figure 1:
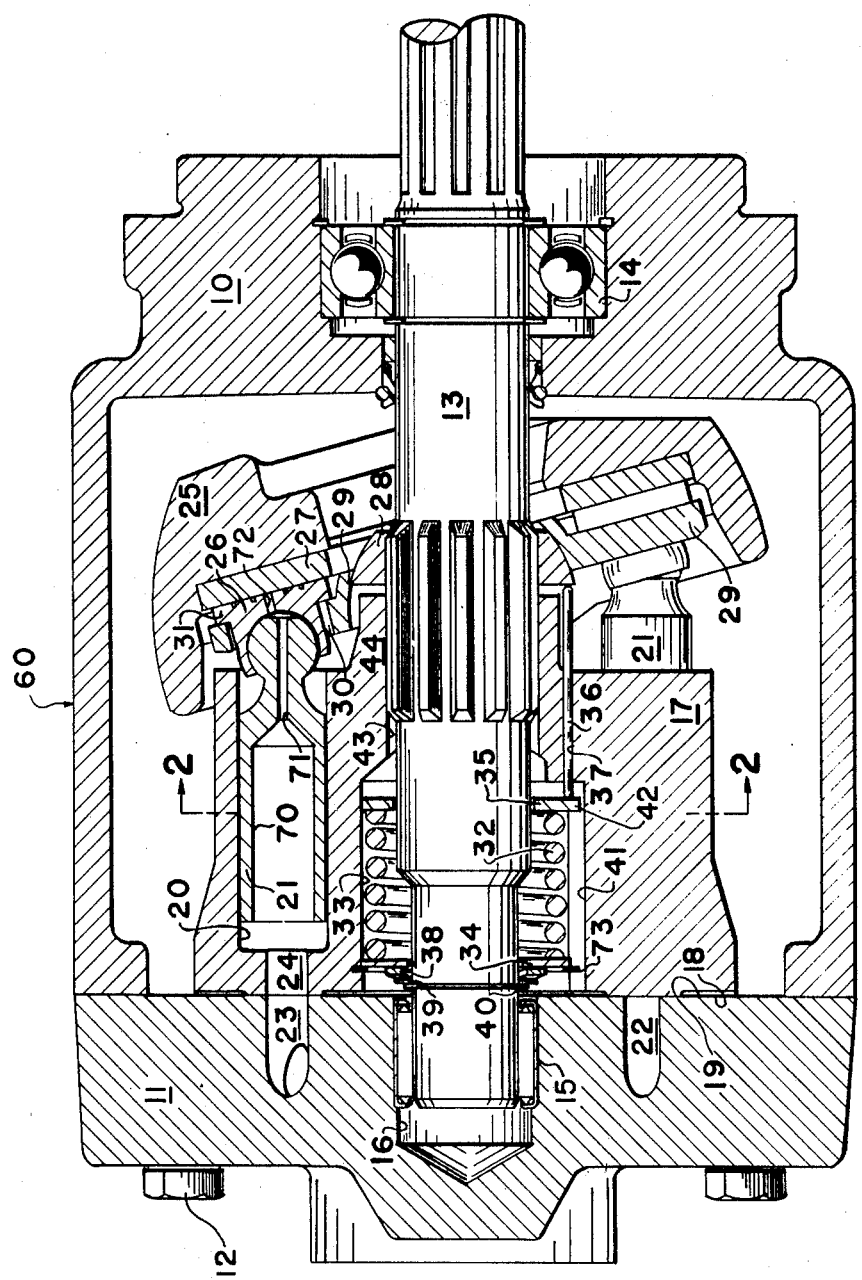
FIG. 1 is a longitudinal section of a fluid energy translating device incorporating a preferred embodiment of this invention.

Turning to the drawings in which the same reference numerals indicate corresponding elements throughout the several views, the embodiment shown in FIG. 1 comprises an axial piston pump or motor generally designated as 60. A housing 10 is rigidly secured to backplate 11 by bolts 12. Drive shaft 13, supported by bearings 14 and 15, extends through the housing and into pilot bore 16 of backplate 11. Appropriate seals are incorporated around shaft 13 adjacent the bearings to prevent fluid leakage from the housing interior. Operatively splined to be rotated by drive shaft 13 is cylinder block 17 whose face 18 contacts valving face 19 of stationary backplate 11. Within cylinder block 17 is a series of annularly arranged bores 20, each of which contains a reciprocally movable piston 21. Arcuate passages 22 and 23 arranged concentric to shaft 13 communicate with bores 20 through ports 24 extending from cylinder face 18 to the respective bore 20. Rotation of cylinder block 17 provides alternate communication of bores 20 with fluid inlet passage 23 and outlet passage 22. Direction of cylinder block rotation may be reversed wherein conduits 23 and 22 would be outlet and inlet passages, respectively.

Tiltable cam plate 25 is bearing mounted to the housing for rotation about an axis perpendicular to the drive shaft axis. Swaged to the outer spherical end of each piston is piston shoe 26 which contacts insert plate 27 of cam plate 25. When cam plate 25 is inclined as shown, reciprocatory motion is imparted to the pistons as the cylinder block rotates. Means (not shown) capable of varying cam plate inclination are also included.

During operation as a pump, externally driven shaft 13 rotates cylinder block 17, and while pistons 21 withdraw outwardly from bores 20 during approximately half a revolution, low pressure fluid is delivered from the inlet passage, say passage 23, to bores 20. This constitutes the suction part of the piston stroke. Fluid is then displaced from the bores into outlet passage 22 during the other half revolution of the cylinder block as pistons 21 retract into bores 20 in reaction to sliding against the inclined surface of cam plate 25.

As a motor, high pressure motive fluid delivered from one of passages 22, 23 into bores 20, thrusts pistons 21 outwardly toward the inclined cam plate surface, the reaction rotating cylinder block 17 and shaft 13. After completing their outward strokes, pistons 21 retract back into bores 20 with the depressurized fluid being exhausted into the other of passages 22, 23. The direction of rotation of shaft 13 is determined by which of the passages 22 or 23 supplies the high pressure motive fluid.

To assist in holding piston shoes 26 in close proximity with insert plate 27, spider pivot 28 is splined to shaft 13 ahead of cylinder block 17. Coacting with the outer spherical surface of spider pivot 28 is spider plate 29 in which are disposed openings 30. Shoes 26 extend through openings 30, and the larger diameter lip portions 31 of shoes 26 are engaged by spider plate 29. Thus, by urging spider pivot 28 rightwardly, spider plate 29 holds shoes 26 in contact with insert plate 27.

A hydrostatic bearing of the type previously mentioned is maintained between surface 18 of cylinder block 17 and valving surface 19 and is supplied with high pressure fluid by leakage from ports 24 across surfaces 18 and 19. Fluid for the hydrostatic bearing maintained between piston shoes 26 and insert plate 27 flows from bores 20 through central piston bores 70 and 71, through conduits 72 in piston shoes 26 to flow between the contacting surfaces of shoes 26 and insert plate 27. As previously mentioned, the relatively rotating surfaces must remain in close proximity for proper operation of the hydrostatic bearings.

To provide a mechanical bias to urge pistons 21 toward cam plate 25 and hold shoes 26 against insert plate 27, and a mechanical bias to urge face 18 of cylinder block 17 toward valving surface 19, spring 32 is placed within central longitudinal recess 33 of cylinder block 17. Spring 32 acts against washer 34 and snap ring abutment 73 seated in a groove in cylinder block 17 to urge the cylinder block leftwardly. Spring 32 also acts against washer 35 and a plurality of pins 36 to urge spider pivot 28 rightwardly. Pins 36 extend through bores 37 in cylinder block 17 and serve to transfer the force of the spring to spider pivot 28.

In some units it has been found that the mechanical biasing force necessary to maintain the shoes in contact with the cam plate is different than the biasing force necessary to hold cylinder block 17 against valving face 19. In pump operation, for example, many instances require more biasing force for the piston shoes than the cylinder block, since the pistons must be accelerated outwardly toward the cam plate when on the suction portion of their stroke. In such case, spring 32 is necessarily selected to exert sufficient force to maintain shoes 26 in contact with insert plate 27.

To reduce the biasing force acting on cylinder block 17 from that magnitude required for shoes 26 to that required for the cylinder block, the unit has force limiting means including a resilient member in the form of wave washer 38 acting between washer 34 and shaft 13, as more clearly illustrated in FIG. 3. The force of wave washer 38, of less magnitude than the force of spring 32, is leftwardly grounded to the shaft 13 through washer 39 and snap ring abutment 40 which seats in an annular groove provided in the shaft. Snap ring 40 acts as a grounding reference point for the force limiting means, as it is axially fixed with respect to the axial piston unit. Resilient wave washer 38 bears against washer 34 to counteract a specified portion of the bias of spring 32 and reduce the leftward bias on cylinder block 17 to a predetermined, desired magnitude.

By effectively grounding to drive shaft 13 a portion of the leftward force of spring 32, mechanical biasing forces of correct, non-excessive magnitude bear against the cylinder block as well as the pistons. The invention is, of course, readily adaptable for furnishing a greater biasing force to the cylinder block than to the piston shoes, if such proportion of biasing forces is required. The invention thus provides precise biasing forces in an extremely compact manner without introducing elements requiring precise manufacturing techniques. The friction and wear between the relatively rotating components are minimized, and efficiency of the unit is augmented.

The design and shape of the cylinder block central recess 33 enhances the compactness and strength of the unit. In FIG. 2, a cross-section of recess 33 taken along line 2-2 of FIG. 1, are shown a plurality of axial grooves 41 angularly positioned intermediate adjoining piston bores 20. Washer 35 is shaped to coincide with the cross-section of recess 33 and has one or more teat portions 42 extending into grooves 41. Referring to FIGS. 1 and 2, each pin receiving bore 37 aligns with a groove 41, thereby allowing bores 37 to be spaced radially apart from splined opening 43 of neck 44. Such arrangement directly increases the strength of neck portion 44 of the cylinder block. Still, in FIG. 2, sufficient material strength of cylinder block 17 is maintained with the inclusion of grooves 41 as they are circumferentially located between adjoining bores 20. As a hypothetical alternative, recess 33 could be enlarged to allow positioning of pin receiving bores 37 radially spaced from splined opening 43 as herein shown, but the wall between recess 33 and bores 20 would then be too thin to withstand the hydraulic pressures developed within bores 20. In this hypothetical instance, bores 20 could be moved radially outwardly to increase wall thickness; however, such alteration would directly contribute to an increase in overall size of the unit. Returning to the present invention, it can be seen that inclusion of grooves 41 circumferentially postioned on small diameter recess 33 to accommodate washer 35 and pins 36, greatly increases cylinder block strength without increasing unit size.

FIGURE 4 EMBODIMENT

Shown is a partial view of the central recess 33 area of an axial piston pump or motor as shown in full in FIG. 1, illustrating a different embodiment of the bias force limiting means of the present invention. The full force of spring 32 is again transmitted to the pistons and shoes through washer 35 and pins 36 acting against the spider pivot. Spring 32 bears against both cylinder block 17 and shaft 13 through flexible washer 45 and snap rings 46 and 47. Snap ring groove 48 which accepts snap ring 47 to form grounded abutment means for spring 32, is directly positioned, or effectively positioned with the inclusion of shims 51, axially offset away from backplate 11 and toward the swash plate with respect to the position of snap ring abutment 46 in the cylinder block.

Before snap ring 47 is inserted in its groove, which is the last step in assembly of the mechanical biasing means, the full force of spring 32 is transmitted through washer 45 to urge cylinder block 17 toward valving surface 19. As snap ring 47 is assembled into groove 48, resilient washer 45 is distorted to transfer a portion of the force of spring 32 to drive shaft 13. Consequently, cylinder block 17 is subjected only to a portion of the bias of spring 32, and only the necessary magnitude of mechanical bias.

At least three factors determine the ratio between the portion of force of spring 32 exerted on cylinder block 17 and that portion grounded to drive shaft 13: The resiliency of washer 45; the relative positions of snap rings 46 and 47; the relative positions of the mean diameter 49 of washer 45 and the mean diameter 50 of spring 32. Varying one or more of these factors will adjust the biasing force on cylinder block 17. For example, to decrease the bias on cylinder block 17, washer 45 can be replaced by a stiffer washer that transfers a greater portion of the force of spring 32 to the drive shaft. Alternately, shims 51 may be added between washer 45 and snap ring 47 to change the effective positions of snap rings 46 and 47 and increase the deflection of washer 45 to decrease the bias on the cylinder block. Another method is to replace spring 32 with a smaller diameter spring; the point of application of the force of spring 32 onto washer 45 is thereby shifted toward drive shaft 13 to increase the load transmitted to shaft 13 and, accordingly, reduce the bias on cylinder block 17.

FIGURE 5 EMBODIMENT

Drivingly connected to drive shaft 13 is axially adjustable cylinder block 52, which has a plurality of annularly arranged axial blind bores 53 that are radially and angularly displaced from the cylinder block piston bores. Biasing springs 54 are inserted into each bore 53 and extend between flanged end 56 of pivot 28 and cylinder block 52. Springs 54 bias pistons 21 toward cam plate 25 and urge the cylinder block toward valving surface 19. The bottoms of bores 53 constitute an abutment on the cylinder block for springs 54 in the same manner as the snap rings in the previously described embodiments. Spring wave washer 38 acts on cylinder block 52 through snap ring 55 to directly oppose biasing springs 54 and effectively transfer a portion of the force of springs 54 to drive shaft 13 through washer 39 and snap ring 40.

Wave washer 38, exerting substantially less force on cylinder block 52 than springs 54, counteracts a specified portion of the bias of springs 54 to reduce, to the desired magnitude, the force urging cylinder block surface 18 toward valving surface 19. The bias of springs 54 is of a magnitude sufficient to maintain shoes 26 in contact with insert plate 27 and the cam 25.

While preferred embodiments of the invention have been herein set forth in detail for explanatory purposes, it will be understood that modifications and variations of the invention may be effected without departing from the spirit and scope of its novel concepts as expressed in the appended claims.

Having clearly described the invention and thereby enabling those skilled in the art to construct and use its principles, I claim:

1. In an axial piston unit having a housing, a drive shaft disposed in the housing, a cylinder block connected for rotation with the drive shaft and having a plurality of annularly arranged piston bores therein, a backplate with fluid inlet and discharge passages having a valving surface coacting with said cylinder block to alternately communicate said piston bores with said fluid passages through ports in the cylinder block upon rotation of said cylinder block, pistons having inner ends positioned in said bores, bearing members universally mounted to outer ends of said pistons, an inclinable swash plate contacting said piston bearing members in driving relation to the pistons upon relative rotation between the cylinder block and the swash plate, axially slidable hold-down means engaging said bearing members to assist in maintaining said bearing members in close proximity of the swash plate, wherein the improvement comprises:

first abutment means located in said cylinder block;
   biasing means acting between said first abutment means and said hold-down means exerting a bidirectional substantially axial force to urge the cylinder block toward the valving surface and the bearing members toward the swash plate;
   second abutment means on said drive shaft; and
   force limiting means acting against said second abutment means exerting an opposing force counteracting said bidirectional force in one direction, whereby the biasing forces transmitted to the hold-down means and cylinder block are of values different by the magnitude of said opposing force.

2. An axial piston unit comprising:
   a housing;
   a cylinder block in said housing;
   a power drive shaft operatively connected with the cylinder block;
   a backplate having a valving surface coacting with said cylinder block and having fluid inlet and discharge conduits therein;
   a plurality of pistons reciprocable within axial bores in said cylinder block, said bores upon rotation alternately communicating with said inlet and discharge conduits through ports in the cylinder block;
   bearing shoes universally mounted to the outer ends of said pistons;
   a swash plate in said housing disposed at the opposite end of the cylinder block from said backplate and drivingly contacting said bearing shoes;
   axially slidable hold-down means engaging said bearing shoes;
   first abutment means on said cylinder block;
   spring means acting between said hold-down means and said first abutment means to urge the shoes toward the swash plate and the cylinder block toward the backplate;
   second abutment means on said drive shaft; and
   force limiting means acting between said second abutment means and said spring means and exerting an opposing force effective to decrease the force of said spring means on the cylinder block, whereby the force exerted on the hold-down means exceeds the force transmitted to the cylinder block by the magnitude of said opposing force.

3. An axial piston unit comprising:
   a housing;
   a drive shaft disposed in said housing;
   a cylinder block provided with a central recess and connected for rotation with said drive shaft, said cylinder block having a plurality of annularly arranged piston bores;
   a backplate with fluid inlet and discharge passages having a valving surface coacting with said cylinder block to alternately communicate said piston bores with said fluid passages through ports in the cylinder block upon rotation of the cylinder block;
   pistons having their inner ends positioned in said bores;
   bearing members universally mounted to the outer ends of said pistons;
   an inclinable swash plate contacting said piston bearing members in driving relation to the pistons upon relative rotation between the cylinder block and the swash plate;
   hold-down means to assist in maintaining said bearing members in close proximity of the swash plate including a spider pivot connected for rotation with the drive shaft and axially slidable thereon, and a spider plate engaging said bearing shoes and pivotally mounted on a spherical outer surface of the spider pivot;
   a snap ring located in said cylinder block within the central recess;
   abutment means on said shaft axially spaced apart from said snap ring toward the backplate;
   a force transmitting connection extending from the central recess to the spider pivot;
   a washer encircling the drive shaft and contacting said snap ring;
   biasing means extending between said force transmitting means and said washer, thereby transmitting biasing forces to said hold-down means and cylinder block; and
   resilient force limiting means acting against said abutment means and said washer exerting an opposing force to counteract the force of the biasing means exerted on said washer, whereby the biasing force transmitted to the hold-down means through said washer and snap ring exceeds the biasing force transmitted to the cylinder block by the magnitude of said opposing force.

4. An axial piston device comprising:
   a housing;
   a cylinder block within said housing, said cylinder block having a plurality of annularly arranged piston bores therein;
   a drive shaft operatively connected to said cylinder block;
   a plurality of pistons having inner ends disposed within said piston bores;
   a backplate having a valving surface coacting with said cylinder block and having conduit means extending to said valving surface for selectively distributing fluid to said piston bores upon rotation of the cylinder block;
   bearing members universally mounted to the outer ends of said pistons;
   an inclinable swash plate having a surface coacting with said bearing members and mounted in a driving relationship with the pistons;
   axially slidable hold-down means engaging said bearing members;
   first abutment means on said cylinder block;

second abutment means on said drive shaft;
spring means acting between said first abutment mean and said hold-down means to urge the cylinder block toward said valving suface and the bearing members toward said coacting surface; and
resilient force limiting means acting between said second abutment means and said cylinder block, said force limiting means effectively transferring a predetermined portion of the force exerted by said spring means against the cylinder block to the drive shaft thereby limiting the force exerted by said spring means on said cylinder block.

5. The device of Claim 4 wherein said cylinder block has a central axial recess, and wherein said force limiting means transferring a portion of the force exerted by said spring means to the drive shaft includes third abutment means on the cylinder block located in said central recess and spaced axially apart from said second abutment means toward said swash plate, and a resilient member acting between said second and third abutment means.

6. The device of Claim 4 wherein said spring means comprises a plurality of springs disposed in substantially axial bores in the cylinder block spaced apart from said piston bores, the bottoms of said bores forming said first abutment means on the cylinder block.

7. An axial piston unit having a housing, a drive shaft disposed in the housing, a cylinder block having a central recess and connected for rotation with the drive shaft, a stationary backplate having a pair of conduits for selectively directing fluid in and out of annular bores in said cylinder block through ports in the cylinder block, pistons with inner ends reciprocable within said annular bores, piston shoes pivotally mounted to outer ends of the pistons, an inclined swash plate mounted in said housing and engaging said piston shoes in a driving relationship, wherein the improvement comprises:
first abutment means on said cylinder block extending into said central recess;
second abutment means on said drive shaft spaced axially apart from said first abutment means a predetermined distance toward said swash plate;
force transmitting means extending from said recess to said hold-down means;
a washer encircling the drive shaft and engaging the force transmitting means within the central recess; resilient means contacting both said first and second abutment means; and
spring means situated in said central recess and acting against said washer and said resilient means, whereby the force of the spring means in a first axial direction is transmitted entirely to the hold-down means and in a second, opposite axial direction is transmitted to the drive shaft and cylinder block in a predetermined ratio.

8. An axial piston unit comprising:
a housing;
a drive shaft disposed in said housing;
a cylinder block connected for rotation with said drive shaft and provided with a plurality of annularly arranged piston bores, a central recess, at least one groove extending axially along the periphery of said recess, and a through bore extending from said groove;
a backplate with fluid inlet and discharge passages having a valving surface coacting with said cylinder block to alternately communicate said piston bores with said fluid passages through ports in the cylinder block upon rotation of the cylinder block;
pistons having their inner ends positioned in said piston bores;
bearing members universally mounted to the outer ends of said pistons;
an inclinable swash plate contacting said piston bearing members in driving relation to the pistons upon relative rotation between the cylinder block and the swash plate;
hold-down means to assist in maintaining said bearing members in close proximity of the swash plate including a spider pivot connected for rotation with the drive shaft and axially slidable thereon, and a spider plate engaging said bearing shoes and pivotally mounted on a spherical outer surface of the spider pivot;
a snap ring located in said cylinder block within the central recess;
abutment means on said shaft axially spaced apart from said snap ring toward the backplate;
force transmitting means disposed in said through bore and extending into said groove;
a washer encircling the drive shaft and contacting said snap ring;
biasing means in said central bore extending between said force transmitting means and said washer, thereby transmitting biasing forces to said hold-down means and cylinder block; and
resilient force limiting means acting against said abutment means and said washer exerting an opposing force to counteract the force of the biasing means exerted on said washer, whereby the biasing force transmitted to the hold-down means through said washer and snap ring exceeds the biasing force transmitted to the cylinder block by the magnitude of said opposing force.

9. In an axial piston unit having a housing, a drive shaft disposed in said housing, a cylinder block connected for rotation with said drive shaft and having a plurality of annularly arranged piston bores therein, a backplate with fluid inlet and discharge passages and having a valving surface coacting with said cylinder block to alternately communicate said piston bores with said fluid passages through ports in the cylinder block upon rotation of said cylinder block, pistons having their inner ends positioned in said bores, bearing members universally mounted to the outer ends of said pistons, an inclinable swash plate contacting said piston bearing members in driving relation to the pistons upon relative rotation between the cylinder block and the swash plate, axially slidable hold-down means engaging said bearing members to maintain said bearing members in close proximity of the swash plate, the improvement which comprises;
said cylinder block having a central recess and having at least one groove extending axially along the periphery of said recess, the cylinder block further having a through bore extending from said groove;
biasing means disposed in said central recess; and
force transmitting means disposed in said through bore and extending into said groove to transmit the force of the biasing means to the hold-down means.

10. The device of Claim 9 wherein a washer is disposed in said central recess and a portion thereof extends into said groove, the washer interposed between said biasing means and said force transmitting means.